United States Patent [19]

Inoue

[11] Patent Number: 4,556,775
[45] Date of Patent: Dec. 3, 1985

[54] AUTOMATIC SPARK-DEPOSITING APPARATUS

[75] Inventor: Kiyoshi Inoue, Tokyo, Japan

[73] Assignee: Inoue-Japax Research Incorporated, Japan

[21] Appl. No.: 665,394

[22] Filed: Oct. 26, 1984

[30] Foreign Application Priority Data

Oct. 26, 1983 [JP] Japan ................................ 58-199202
Oct. 26, 1983 [JP] Japan ................................ 58-200349

[51] Int. Cl.⁴ ............................ B23K 9/04; B23K 9/12
[52] U.S. Cl. .................................. 219/76.13; 219/76.15
[58] Field of Search ................. 219/76.13, 76.14, 76.15

[56] References Cited

U.S. PATENT DOCUMENTS

| | | | |
|---|---|---|---|
| 3,277,266 | 10/1966 | Blaszkowski | 219/76.13 |
| 3,555,235 | 1/1971 | Darrow et al. | 219/76.14 |
| 3,832,514 | 8/1974 | Antonov | 219/76.13 |
| 4,226,697 | 10/1980 | Antonov et al. | 219/76.13 |

*Primary Examiner*—Clifford C. Shaw
*Attorney, Agent, or Firm*—Finnegan, Henderson, Farabow, Garrett & Dunner

[57] ABSTRACT

A spark-depositing apparatus includes an electrode storage arrangement which stores a plurality of rigid electrodes. When a new electrode is required, a chuck receives one of these electrodes. A clamp brings the chuck to a first position to allow the electrode to slide into the chuck and brings the chuck to a second position to hold the electrode fast. The electrode is then activated to deposit material on a workpiece in a predetermined pattern.

10 Claims, 8 Drawing Figures

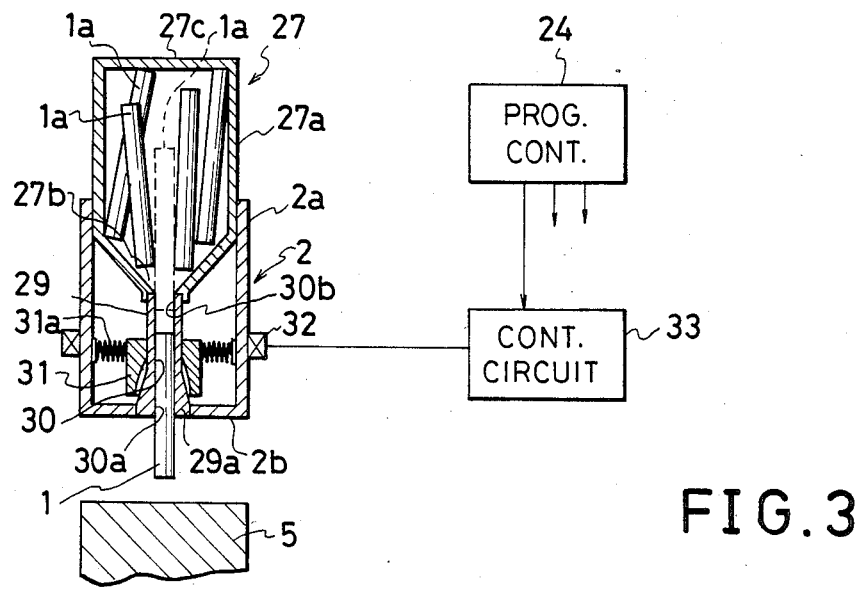
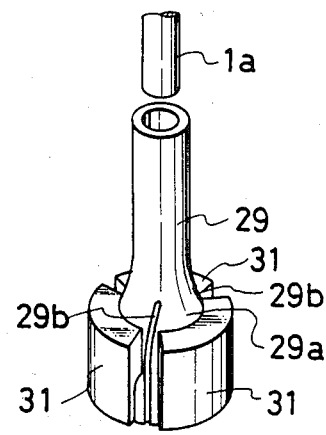
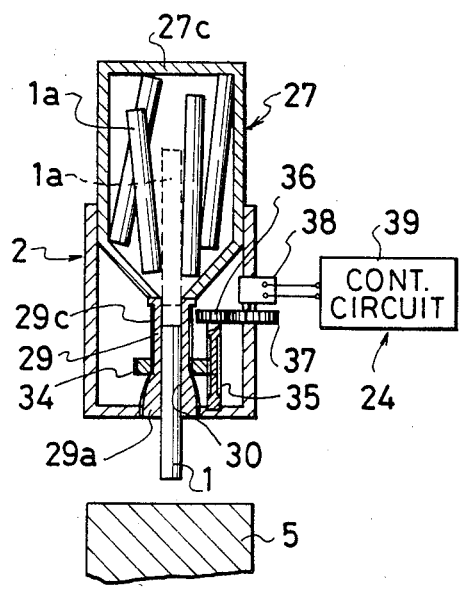

FIG. 5
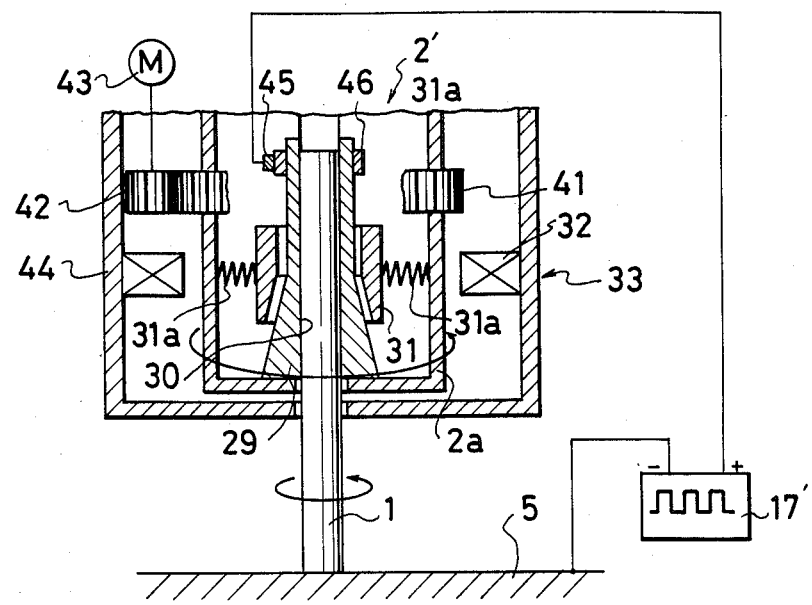
FIG.6a  FIG.6c
 
1(1a)   1(1a)   1(1a)
FIG.6b

AUTOMATIC SPARK-DEPOSITING APPARATUS

FIELD OF THE INVENTION

The present invention relates to spark deposition and, more particularly, to a new and improved spark-depositing apparatus for coating a surface of a conductive workpiece with a layer of a metallic substance.

BACKGROUND OF THE INVENTION

In spark-depositing techniques, an electrode typically serves as a source of the substance to be deposited on the workpiece surface. As a localized portion of the electrode and a localized portion of the workpiece surface are brought into and/or out of mutual contact, spark discharge is caused to develop between them with a brief electrical impulse which is of an intensity sufficient to produce fusion of the localized electrode portion so that the localized fusion substance in a small amount is transferred to the small localized discharge-impinging area of the workpiece and cooled thereon to form a firm metallurgical bond with the workpiece substrate. By continuous sweeping such contact discharge over a selected surface region of the workpiece, a uniform layer of the deposit substance which is effective to harden or otherwise modify the original surface can be obtained.

In a typical form of spark-deposition, the electrode may be a solid rotary member rotated to bring its end face in sliding or tangential movement over the workpiece surface and the electrode substance is transferred onto the latter with the aid of repeated contact discharges. Such intermittent contact discharges can be effected by a capacitor circuit designed to charge and instantaneously discharge across the points of contact between the electrode and the workpiece and recharge as the contact regions shifts from one contact to a next contact point between the electrode and the workpiece. Otherwise, a mechanical or electrical switching of a continuous voltage source has been employed to provide periodically a pulsed voltage across the moving interface of the electrode and the workpiece.

An electrode member composed of the depositable substance may also be repeatedly driven into contact with a workpiece, for example, under a spring force applied to the electrode held resiliently upon an electrode holder. A spark discharge is drawn between the electrode tip and the workpiece from a charged capacitor, thereby creating a partial weld between them. Coupled with the electrode holder, there is an electromagnetic coil designed to be energized at least in part by the charging current of the capacitor or short-circuit condition between the electrode and the workpiece. The coil is thus operable, upon the capacitor discharge, to draw the electrode tip abruptly away from the workpiece surface in order to break the weld and leave substance from the electrode tip deposited upon the workpiece.

With whichever rotary and vibratory systems described is employed, it has so far been commonly believed that spark-depositing operations are relatively laborious and inefficient tasks inasmuch as the operator needs to manipulate the electrode assembly and to renew the consumed electrodes from time to time. Thus, the problems particularly arise where a large workpiece and a number of workpieces should be coated by spark-deposition, necessitating a large amount of the depositable substance to be furnished by the spark-depositing electrodes.

OBJECT OF THE INVENTION

Accordingly, the present invention seeks to provide a spark-depositing apparatus which is capable of carrying out a coating operation automatically.

SUMMARY OF THE INVENTION

In accordance with the present invention there is provided in a first aspect thereof a spark-depositing apparatus for coating a surface of a conductive workpiece with a layer of a metallic substance, which apparatus comprises: an electrode storage means for storing a plurality of rigid but consumable, unconsumed and elongate electrodes composed of the metallic substance; a chuck means supported by a support member and having an inner electrode guide passage having a forward end open towards the workpiece surface and a rear open end for receiving each unconsumed elongate electrode from the storage means; clamp means associated with the chuck means and operable to bring it into a first operating position to allow the electrode to freely move longitudinally through the said guide passage in the direction of the workpiece surface and into a second operating position to hold the electrode fast at a given position in the passage such that the electrode lies partly projecting towards its end portion from the passage to enable an end face thereof to be located adjacent the workpiece surface; means for activating the electrode so held in the said passage to iteratively bring the electrode end face into a spark-depositing relationship with a localized portion of the workpiece surface such that an amount of the said substance may be transferred from the electrode end face into the localized surface portion; first drive means for relatively displacing the support member and the workpiece to cause the electrode end portion to effectively move over the workpiece surface so that localized spark-deposit of the substance continues to develop along a programmed path over the surface while the electrode is consumed from the end face to gradually reduce its length; second drive means for relatively displacing the support member and the workpiece in a direction in which they are approached so as to maintain the intermittent spark-depositing relationship of the electrode end face with the workpiece surface and to compensate for the gradual consumptive reduction of electrode length; command means for generating a command signal representing the said consumptive reduction in excess of a predetermined value to interrupt the operations of the activating means and the first and second drive means; and control means associated with the clamp means and responsive to the command signal for bringing the chuck means into the first operating position to allow the consumed electrode to detach from the said passage and one unconsumed electrode in the storage means to be introduced into the passage and thereafter bringing the chuck means into the second operating position to hold the introduced electrode fast at a said given position in the said passage.

Preferably, the command means is adapted to generate a second command signal representing a predetermined distance of relative approach between the support member and the workpiece surface by the second drive means to act on the activating means and the first and second drive means for interrupting operations thereof, then to act on the control means for bringing the chuck means into the first operating position to render the electrode therein movable through the guide passage, then to act on the second drive means for relatively displacing the support member and the workpiece away from each other by a said predetermined distance while maintaining adjacent the workpiece surface the end face of the electrode in the said passage, and thereafter to act on the control means for bringing the chuck means into the second operating position to hold fast in the said passage the electrode with the end face adjacent the workpiece surface. Preferably, the command means is adapted to generate a sequence of such second command signals for acting as aforementioned before the said consumptive reduction in electrode length exceeds the said predetermined value.

The invention also provides, in a second aspect thereof, a spark-depositing apparatus for coating a surface of a conductive workpiece with a layer of a metallic substance, which apparatus comprises: a chuck means supported by a support member and having an inner electrode guide passage having a forward end open towards the workpiece surface and a rear open end for receiving an unconsumed elongate electrode composed of the metallic substance; clamp means associated with the chuck means and operable to bring it into a first operating position to allow the electrode to freely move longitudinally through the said guide passage in the direction of the workpiece surface and into a second operating position to hold the electrode fast at a given position in the passage such that the electrode lies partly projecting towards its end portion from the passage to enable an end face thereof to be located adjacent the workpiece surface; means for activating the electrode so held in the said the passage to iteratively bring the electrode end face into a spark-depositing relationship with a localized portion of the workpiece surface such that an amount of the said substance may be transferred from the electrode end face into the localized surface portion; first drive means for relatively displacing said support member and the workpiece to cause the electrode end portion to effectively move over the workpiece surface so that localized spark-deposit of said substance continues to develop along a programmed path over the surface while the electrode is consumed from the end face to gradually reduce its length; second drive means for relatively displacing the support member and the workpiece in a direction in which they are approached so as to maintain the intermittent spark-depositing relationship of the electrode end face with the workpiece surface and to compensate for the gradual consumptive reduction of the electrode length; command means for generating a command signal representing a predetermined distance of relative approach between the support means and the workpiece surface by the second drive means to interrupt the operations of the activating means and the first and second drive means; control means associated with the clamp means and responsive to the command signal for bringing the chuck means into the first operating position to render the electrode therein movable through the said guide passage, then to act on the second drive means for relatively displacing the support member and the workpiece away from each other by a said predetermined distance while maintaining adjacent the workpiece surface the end face of the electrode in the said passage, and thereafter to act on the control means for bringing the chuck means into the second operating position to hold fast in the passage the electrode with the end face adjacent the workpiece surface.

Preferably, the command means is adapted to generate a sequence of such second command signals for acting as aforementioned before the said consumptive reduction in electrode length exceeds a predetermined value. Preferably, the command means is adapted to generate a second command signal representing the said consumptive reduction in electrode length in excess of the said predetermined value to interrupt the operations of the activating means and the first and second drive means and then to act on said control means to bring the chuck means into the first operating position to allow the consumed electrode to detach from the said guide passage. Then the apparatus may further comprise: an electrode storage means for storing a plurality of such unconsumed electrodes; and means operable in response to the second command signal for transferring one of the unconsumed electrodes in the storage means into the passage and then acting on the control means for bringing the chuck means into said second operating position to hold the introduced electrode fast at a given position in the said guide passage as aforesaid.

The activating means may include means for vibrating the support member to intermittently make and break contact between the electrode end face and the workpiece surface, and a power supply for effecting a spark discharge between the end face and the workpiece during each vibrational cycle.

Alternative of or in addition to the vibrating means, the activating means may include means for rotating the support member about an axis thereof so as to cyclically move the end face in sliding contact with the workpiece surface, the power supply acting to effect intermittent spark discharges between the workpiece surface and the end face moving in sliding contact therewith.

BRIEF DESCRIPTION OF THE DRAWINGS

These and other features of the present invention as well as advantages thereof will become more readily apparent from a reading of the following description of certain preferred embodiments thereof, which are given by way of example only, with reference to the accompanying drawings in which:

FIG. 2 is a diagrammatic sectional view illustrating an electrode storage and an electrode support as generally shown in FIG. 1, including a chuck member and clamp means, according to the invention;

FIG. 3 is a perspective view illustrating a chuck and clamp assembly of FIG. 2;

FIG. 4 is a diagramatic sectional view illustrating another embodiment of the chuck and clamp assembly which may be employed in the apparatus according to the invention;

FIG. 5 is a diagrammatic sectional view illustrating a modified electrode assembly of rotary type which may form a part of the apparatus according to the invention; and FIG. 6(a), 6(b) and 6(c) are cross-sectional view illustrating typical forms of the spark-depositing electrode which may be employed in the practice of the present invention.

SPECIFIC DESCRIPTION

Figure 1:
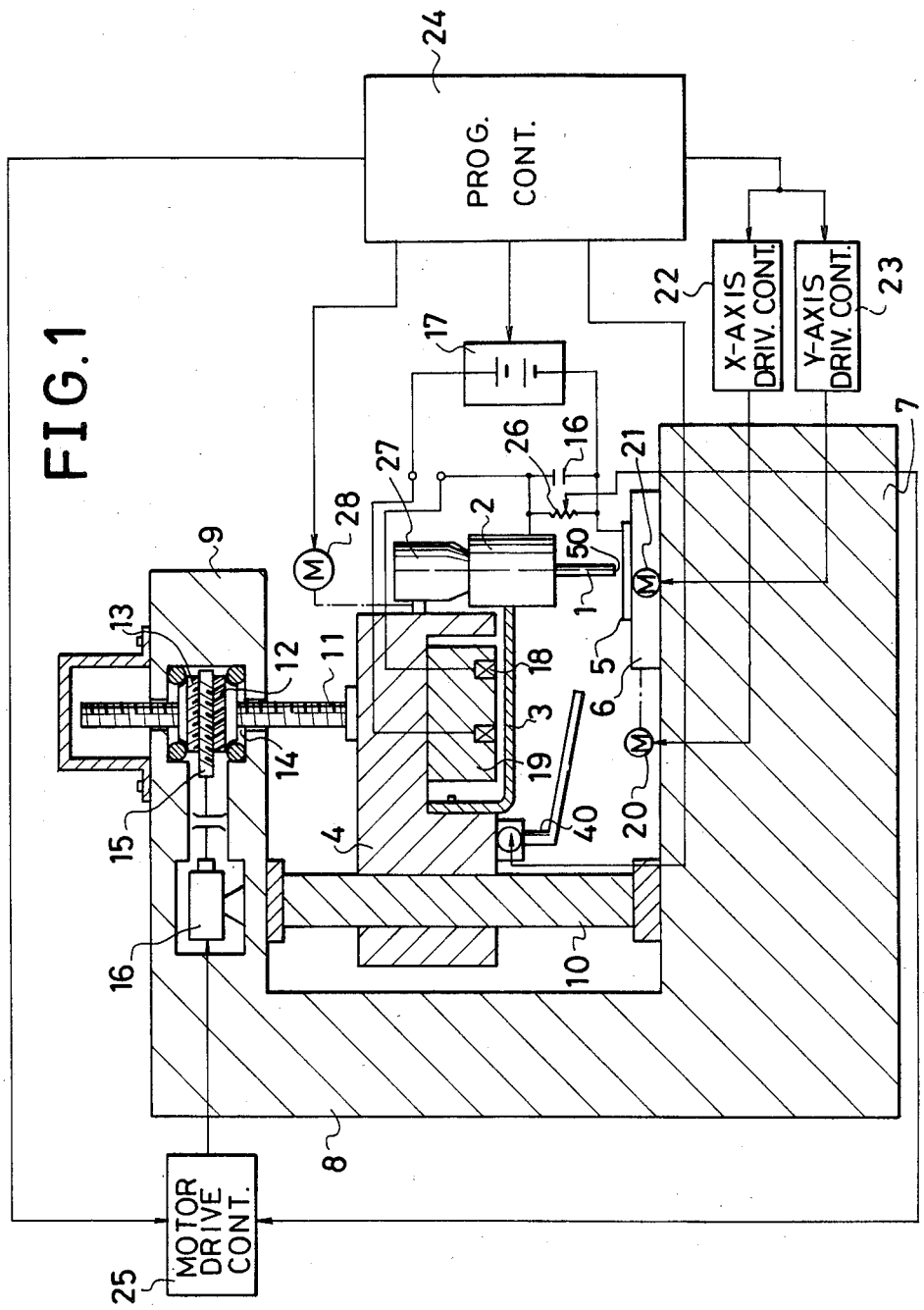
FIG. 1 is a diagrammatic view illustrating an automatic spark-depositing apparatus or machine embodying the present invention.

Referring now to FIG. 1, a rod-form electrode 1 composed of tungsten-carbide or other depositable substance is shown as supported by a support member 2 which is in turn carried on an L-shaped spring plate 3 secured to a block 4. Disposed below the vertical electrode 1 is a conductive workpiece 5 composed of, say, a steel and securely mounted on a cross-table 6 which are movably mounted on a machine bed 7. The machine has a column 8 standing upright on the bed 7 and having a head portion 9 overlying the block 4. A vertical guide post 10 having the bored block 4 slidably fitted thereon extends between the head portion 9 and the bed 7 in parallel to the column 8. The block 4 has a threaded spindle or lead-screw 11 secured thereto so as to be carried thereby. The spindle 11 is in mesh with a nut 12 having a worm wheel 13 secured thereon in a cavity 14 formed in the head portion. The worm wheel 13 is in mesh with a worm 15 secured to the output shaft of a motor 16. Thus, when the motor 16 is driven in one direction or another, the block 4 is vertically moved down or up to bring the electrode 1 towards or away from the workpiece 5.

A spark-deposition power supply includes a capacitor 16 chargeable by a DC source 17 and dischargeable across a spark depositing interface 50 formed between the electrode 1 and the workpiece 5. The DC source 17 is connected to make the workpiece 5 negative and the electrode 1 positive. In the illustrated arrangement, one terminal of the capacitor 16 is connected to the junction between the workpiece 5 and the negative terminal of the DC source 17 while the positive terminal of the DC source 17 is connected to the junction of the other terminal of the capacitor 16 and the electrode 1 via coils 18 of an electromagnet 19 installed in the block 4 in operative juxtaposition with the spring plate 3. As the charging current passes from the DC source 17 to the capacitor 16, the electromagnet 19 is thus energized to magnetically attract the spring plate 3 and thereby to retract the electrode 1 away from the workpiece 5. As the charging current ceases, the elastic restitution force of the deformed spring 3 brings the electrode tip into hammering contact with the workpiece surface. As the tip approaches the surface, the charge stored on the capacitor 16 is discharged through the narrowing interface 50, thus producing an impulsive spark discharge between the electrode 1 and the workpiece 5, which is of sufficient intensity to fuse and transfer a localized amount of the substance of the electrode onto a localized discharge-impinging area of the workpiece 5. As the spark-depositing cycle is thus periodically effected, the workpiece 5 is displaced relative to the electrode 1 so that the electrode tip effectively sweeps over the workpiece surface.

The cross-table 6 carrying the workpiece 5 is thus displaced by means of a pair of motors 20 and 21 in a horizontal or X-Y plane. The motors 20 and 21 are driven by X-axis drive commands and Y-axis drive commands furnished by their respective drive circuits 22 and 23 in response to a sequence of control instructions generated in a program controller 24 to enable the localized spark-deposit of the substance to continue to develop along a programmed path over the workpiece surface. As the spark-deposition continues, the electrode is consumed from the end face to gradually reduce its length. To compensate, for the reduction in the electrode length, a drive control circuit 25 is provided to controlledly rotate the motor 16 and hence to controlledly move the block 4 and in turn the electrode support 2 axially downwards. The control circuit 25 may operate to move the electrode support 2 axially downwards at a predetermined rate in response to a programmed control signal from controller 24, the rate being programmed to compensate for the electrode consumptive reduction based upon empirical data. Alternatively, the reduction compensatory movement of the electrode support 2 can be achieved through a feedback approach. To this end, in the illustrated embodiment, a sensing resistor 26 is connected across the spark-depositing gap 50 in parallel with the capacitor 16 to sense an average gap voltage which is representative of the average distance between the electrode 1 and the workpiece 5. The sensed voltage can be compared with a reference voltage in the control circuit 25 to produce a correction signal which is applied to the motor 16 to advance the electrode support 2 until the voltage signal being sensed becomes equal to the reference voltage. By so controlledly advancing the electrode support 2 downwards, it is possible to maintain the intermittent spark-depositing relationship of the electrode tip with the workpiece surface in spite of the gradual consumptive reduction of the electrode length.

The machine shown also includes a housing 27 which stores a plurality of unconsumed rod electrodes and is carried on the block 4 above the electrode support 2. The electrode housing 27 is connected to the block 4 so as to be vertically movable up and down by means of a drive unit 28 which is driven by a control signal furnished from the controller 24. As shown in FIG. 2, the housing 27 has a plurality of unconsumed rod electrodes 1a stored therein and has a cylindrical body portion 27a slidably receivable towards its lower, downwardly converging open end portion 27b with a top-open cylindrical receptacle 2a constituting the electrode support member 2. The cylindrical body portion 27a is closed by a cap-shaped cover 27c which is threaded thereto. The cylindrical receptacle 2a centrally accommodates a chuck member 29 and has a centrally bored end wall 2b arranged to retain the member 29. The chuck member 29 internally defines an elongate electrode passage 30 having its lower end 30a open towards the workpiece 5 and its upper open end 30b adapted to adjoin smoothly with the lower open end 27b of the housing 27 when the latter enters slidingly into the receptacle 2a. In the embodiment illustrated, the electrodes 1a (1) are cylindrical rods of an equal length and an equal diameter, and the electrode guidance passage 30 is circular in cross-section and, throughout its length, has a diameter slightly greater than the rod diameter. As seen from FIG. 3, the hollow member 29 has its lower portions which increases downwardly in wall thickness and in which a plurality of longitudinal slits 29b are formed symmetrically about the axis of the member 29.

In the embodiment of FIGS. 2 and 3, a like plurality of segments 31 are disposed to surround the lower portion 29a and serve to constitute a clamp means for the chuck member 29. Thus, in the embodiment illustrated, three segments 31 are resiliently supported by springs 31a to maintain their horizontal positions. The segments 31 are ferromagnetic and a solenoid 32 is wound around the cylindrical receptacle 2a as energizable by a control circuit 33. Thus, when the sole-noid 32 is energized by the control circuit 33, the ferromagnetic segments 31 are electromagnetically attracted together to compress the slitted lower portion 29a of the hollow member 29 inwardly. When the solenoid 33 is deenergized, the segments 31 tend to repel each other against the spring pressure, thus permitting the slitted lower portion 29a of the hollow member 29 to expand outwardly. The control circuit 33 operates in response to command signals from the controller 24.

In the embodiment shown in FIG. 4, the hollow chuck member 29 is formed with an outer threaded surface 29c on which a nut 34 is fitted in mesh therewith. The nut 34 has a geared periphery in mesh with a toothed rod 35 which has at its top a gear 36 in mesh with a gear 37 secured to the output shaft of a motor 38, which is rotatable by a control circuit 39. Thus, when the motor 38 is rotated in one direction, the geared nut 34 is moved downwards to compress the slitted lower end 29a of the hollow member 29 inwardly. When the motor 38 is rotated in the other direction, the nut 34 is moved upwards to allow the slitted lower end 29a of the hollow member 29 to expand outwards. Here again, the control circuit 39 operates in response to command signals from the controller 24.

Each of the clamp means 31 of FIGS. 2 and 3 and the clamp means 34 of FIG. 4 is thus adapted to bring the chuck member 29 in a first operating position to allow the electrode 1 to freely move longitudinally through the guide passage 30 in the direction of the workpiece 5 in the chuck member 29. With the support member 2 spaced by a given initial distance from the workpiece 5, the electrode 1 is allowed to move towards the workpiece 5, here downwards by gravity, until it comes into contact with the workpiece 5. Then, the clamp means 34 is activated to bring the chuck member 29 in a second operating position to hold the electrode 1 fast at that position in the passage 30. At this stage the electrode 1 lies partly projecting from the passage 30 by the initial distance of the support member 2 from the workpiece 5.

During the spark-depositing operation, the motor 16 (FIG. 1) acts to advance the support member 2 towards the workpiece 5 so as to maintain the spark-depositing relationship of the electrode tip or end face with the workpiece surface and to compensate for the reduction of the electrode length. The programmed controller 24 is adapted to generate a command signal representing a predetermined distance of approach of the support member 2 to the workpiece 5, the command signal being transmitted to the motors 16, 20, 21 to interrupt the operations thereof, to the power supply 17 to interrupt the spark discharges and the electrode vibrations, and to the control circuit 33, 39 to act on the clamp means 31, 34 to bring the chuck member 29 first into the first operating position to set free the electrode 1 in the passage 30. The control command is applied to the motor 16 to move the support member 2 upwards by a distance which can be equal to the above-mentioned predetermined distance of approach while leaving the electrode 1 with its tip in contact with the workpiece 5. Then, the control circuit 33, 39 acts on the clamp means 31, 34 to bring the chuck member 29 into the second operating position to hold the electrode 1 fast at that position in the passage 30. Then, the motors 16, 20, 21 are allowed to resume their operations and the power supply 17 is again turned on to resume the spark discharges and the electrode vibrations. A sequence of such command signals are generated from the controller 24 to repeat the retraction of the support member 2. This causes the length of the electrode 1 within the passage 30 to be stepwise reduced.

The controller 24 provides another command signal representing the reduction of the electrode length in excess of a predetermined value, the control command being transmitted to the motors 16, 20, 21 to interrupt their operations, to the power supply 17 to interrupt the spark discharges and the electrode vibrations, and to the control circuit 33, 39 to act on the clamp means 31, 34 to bring the chuck member 29 first into the first operating position to allow the shortened electrode to drop by gravity onto the workpiece 5. A fluid jet device 40 which can be disposed in the vicinity of the working zone may be actuated to apply a blast of air or gas in the working zone under a pressure sufficient to carry away the dropped electrode for disposal. The control command is applied to the motor 28 to move the housing 27 into its electrode transfer position such that one of the stored electrodes 1a may be introduced into the electrode guide passage 30, as indicated by broken lines in FIGS. 2 and 4. The introduced unconsumed electrode 1a is allowed to move downwards by gravity through to passage until its tip comes into contact with the workpiece 5, whereupon the operation as aforesaid is resumed.

FIG. 5 shows a modified electrode support assembly 2' which, instead of being vibratorily coupled to the block 4 as previously described, is secured to the block 4 in the arrangement of FIG. 1. In this assembly, the cylindrical receptacle 2a has a geared collar 41 secured thereto which is mesh with a gear 42 secured to the output shaft of a motor 43. The receptacle 2a has a chuck member 29 and clamp means 31, 31a mounted therein which operate as previously described in connection with FIGS. 2 and 3. In this modified assembly, however, the energizing solenoid 32 is secured to the inner wall of a housing 44 which is provided to accommodate the gear 42 and the collared support member 2a therein. The motor 43 can be mounted on a top portion of the housing 44 and is driven to rotate the electrode support 2a and thus the electrode 1 about a longitudinal axis of the electrode support 2a while the electrode 1 is held in contact with the workpiece surface, thereby providing a rapid rotary or cyclic sliding motion of the electrode end face therewith. A spark-depositing power supply 17' has a positive terminal electrically connected to the electrode 1 via a brush 45, a conductive ring 46 and the conductive chuck member 29 and a negative terminal electrically connected to the workpiece 5 to apply a succession of electrical pulses between the workpiece 5 and the end face of the electrode moving in sliding contact therewith. Intermittent spark discharges thus develop between localized contact areas of the electrode end face and the workpiece surface to intermittently transfer the electrode substance onto the workpiece discharge areas. The elongate cylindrical electrode 1 (1a) typically is a solid cylinder as shown in cross-section in FIG. 6(a). A tubular or hollow cylindrical form of the electrode which is annular or C-shaped in cross section as shown in FIGS. 6(b) and 6(c) is often advantageously employed. With the rotary system described, it is also found advantageous to make the axis of the electrode 1 eccentric with the axis of rotation so that the electrode end face cover a larger area over the workpiece surface in each rotary cycle.

What is claimed is:

1. A spark-depositing apparatus for coating a surface of a conductive workpiece with a layer of a metallic substance, comprising:
   an electrode storage means for storing a plurality of rigid but consumable, unconsumed and elongate electrodes composed of said substance;
   a chuck means supported by a support member and having an inner electrode guide passage having a forward end open towards the workpiece surface and a rear open end for receiving each unconsumed elongate electrode from the storage means;

clamp means associated with said chuck means and operable to bring it into a first operating position to allow the electrode to freely move longitudinally through said passage in the direction of the workpiece surface and into a second operating position to hold the electrode fast at a given position in the passage such that the electrode lies partly projecting towards its end portion from the passage to enable an end face thereof to be located adjacent the workpiece surface;

means for activating said electrode so held in said passage to iteratively bring said electrode end face into a spark-depositing relationship with a localized portion of said surface such that an amount of said substance may be transferred from the electrode end face into the localized surface portion;

first drive means for relatively displacing said support member and the workpiece to cause said electrode end portion to effectively move over the workpiece surface so that localized spark-deposit of said substance continues to develop along a programmed path over the surface while the electrode is consumed from the end face to gradually reduce its length;

second drive means for relatively displacing said support member and the workpiece in a direction in which they are approached so as to maintain the intermittent spark-depositing relationship of the electrode end face with the workpiece surface and to compensate for the gradual consumptive reduction of the electrode length;

command means for generating a command signal representing said consumptive reduction in excess of a predetermined value to interrupt the operations of said activating means and said first and second drive means; and control means associated with said clamp means and responsive to said command signal for bringing said chuck means into said first operating position to allow the consumed electrode to detach from said passage and one unconsumed electrode in the storage means to be introduced into said passage and thereafter bringing said chuck means into said second operating position to hold the introduced electrode fast at a said given position in said passage.

2. The apparatus defined in claim 1 wherein said command means is adapted to generate a second command signal representing a predetermined distance of relative approach between said support member and the workpiece surface by said second drive means to act on said activating means and said first and second drive means for interrupting operations thereof, then to act on said control means for bringing said chuck means into said first operating position to render said electrode therein movable through said guide passage, then to act on said second drive means for relatively displacing said support member and the workpiece away from each other by a said predetermined distance while maintaining adjacent the workpiece surface the end face of the electrode in said passage, and thereafter to act on said control means for bringing said chuck means into said second operating position to hold fast in said passage the electrode with said end face adjacent the workpiece surface.

3. The apparatus defined in claim 2 wherein said command means is adapted to generate a sequence of such second command signals for acting as aforementioned before said consumptive reduction in electrode length exceeds said predetermined value.

4. The apparatus defined in claim 1, claim 2 or claim 3 wherein said activating means includes means for vibrating said support member to intermittently make and break contact between said electrode end face and the workpiece surface, and a power supply for effecting a spark discharge between said end face and the workpiece during each vibrational cycle.

5. The apparatus defined in claim 1, claim 2 or claim 3 wherein said activating means includes means for rotating said support member about an axis thereof so as to cyclically move said end face in sliding contact with the workpiece surface, and a power supply for effecting intermittent spark discharges between the workpiece surface and said end face moving in sliding contact therewith.

6. A spark-depositing apparatus for coating a surface of a conductive workpiece with a layer of a metallic substance, comprising:

a chuck means supported by a support member and having an inner electrode guide passage having a forward end open towards the workpiece surface and a rear open end for receiving an unconsumed elongate electrode composed of said substance;

clamp means associated with said chuck means and operable to bring it into a first operating position to allow the electrode to freely move longitudinally through said passage in the direction of the workpiece surface and into a second operating position to hold the electrode fast at a given position in the passage such that the electrode lies partly projecting towards its end portion from the passage to enable an end face thereof to be located adjacent the workpiece surface;

means for activating said electrode so held in said passage to iteratively bring said electrode end face into a spark-depositing relationship with a localized portion of said surface such that an amount of said substance may be transferred from the electrode end face into the localized surface portion;

first drive means for relatively displacing said support member and the workpiece to cause said electrode end portion to effectively move over the workpiece surface so that localized spark-deposit of said substance continues to develop along a programmed path over the surface while the electrode is consumed from the end face to gradually reduce its length;

second drive means for relatively displacing said support member and the workpiece in a direction in which they are approached so as to maintain the intermittent spark-depositing relationship of the electrode end face with the workpiece surface and to compensate for the gradual consumptive reduction of the electrode length;

command means for generating a command signal representing a predetermined distance of relative approach between said support means and the workpiece surface by said second drive means to interrupt the operations of said activating means and said first and second drive means;

control means associated with said clamp means and responsive to said command signal for bringing said chuck means into said first operating position to render said electrode therein movable through said guide passage, then to act on said second drive means for relatively displacing said support member and the workpiece away from each other by a said predetermined distance while maintaining adjacent the workpiece surface the end face of the electrode in said passage, and thereafter to act on said control means for bringing said chuck means into said second operating position to hold fast in said passage the electrode with said end face adjacent the workpiece surface.

7. The apparatus defined in claim 6 wherein said command means is adapted to generate a sequence of such second command signals for acting as aforementioned before said consumptive reduction in the electrode length exceeds a predetermined value.

8. The apparatus defined in claim 7 wherein said command means is adapted to generate a second command signal representing said consumptive reduction in electrode length in excess of said predetermined value to interrupt the operations of said activating means and said first and second drive means and then to act on said control means to bring said chuck means into said first operating position to allow the consumed electrode to detach from said passage, the apparatus further comprising:

an electrode storage means for storing a plurality of such unconsumed electrodes; and means operable in response to said second command signal for transferring one of said unconsumed electrodes in said storage means into said passage and then acting on said control means for bringing said chuck means into said second operating position to hold said introduced electrode fast at a given position in said passage as aforesaid.

9. The apparatus defined in claim 6, claim 7 or claim 8 wherein said activating means includes means for vibrating said support member to intermittently make and break contact between said electrode end face and the workpiece surface, and a power supply for effecting a spark discharge between said end face and the workpiece during each vibrational cycle.

10. The apparatus defined in claim 6, claim 7 or claim 8 wherein said activating means includes means for rotating said support member about an axis thereof so as to cyclically move said end face in sliding contact with the workpiece surface, and a power supply for effecting intermittent spark discharges between the workpiece surface and said end face moving in sliding contact therewith.

* * * * *